Aug. 14, 1934.    A. W. MOLINARE    1,970,014
AUTOMATIC TRACTOR TRAILER COMBINATION
Filed Oct. 28, 1931    4 Sheets-Sheet 1
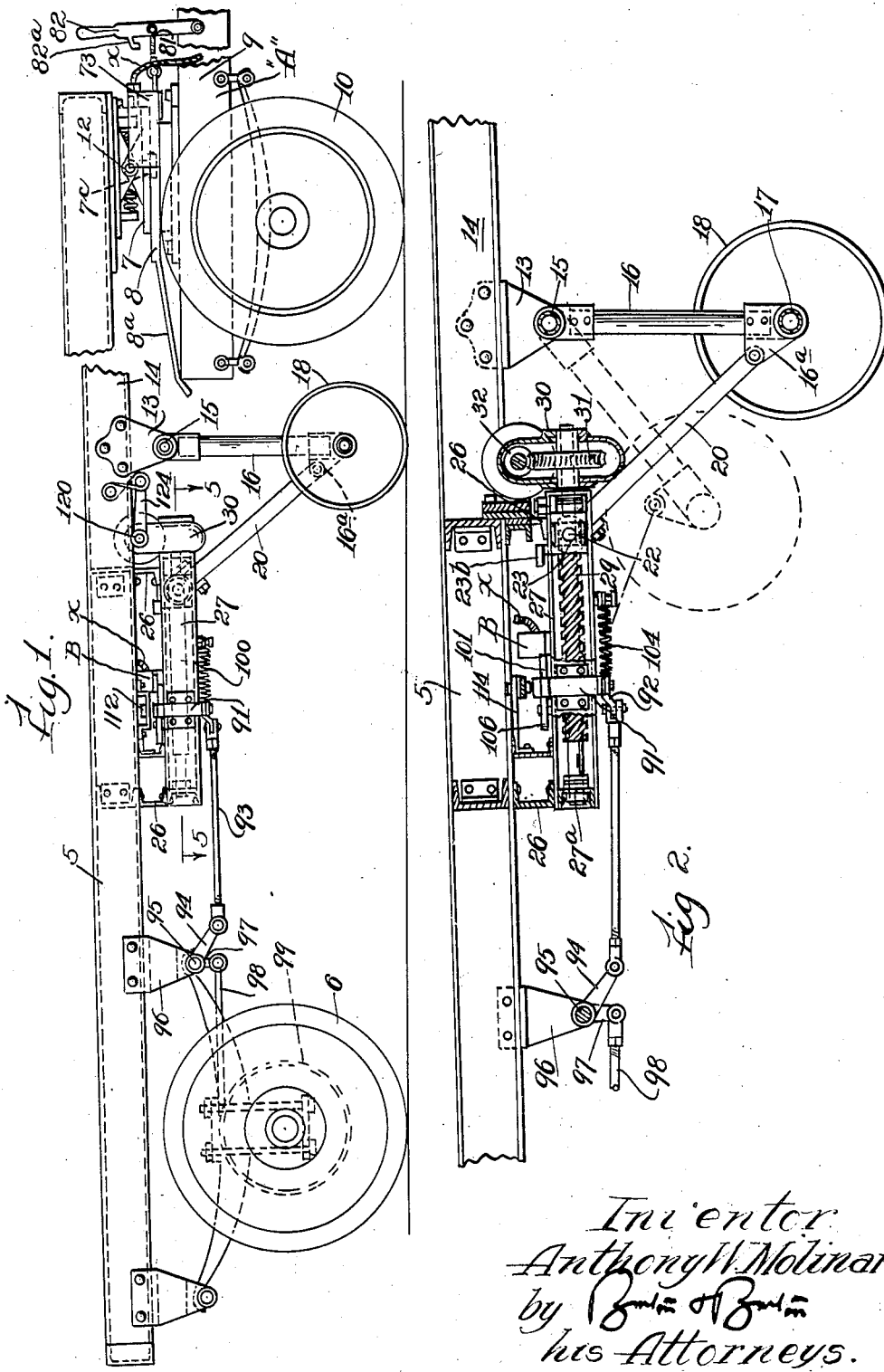

Aug. 14, 1934.   A. W. MOLINARE   1,970,014
AUTOMATIC TRACTOR TRAILER COMBINATION
Filed Oct. 28, 1931   4 Sheets-Sheet 2
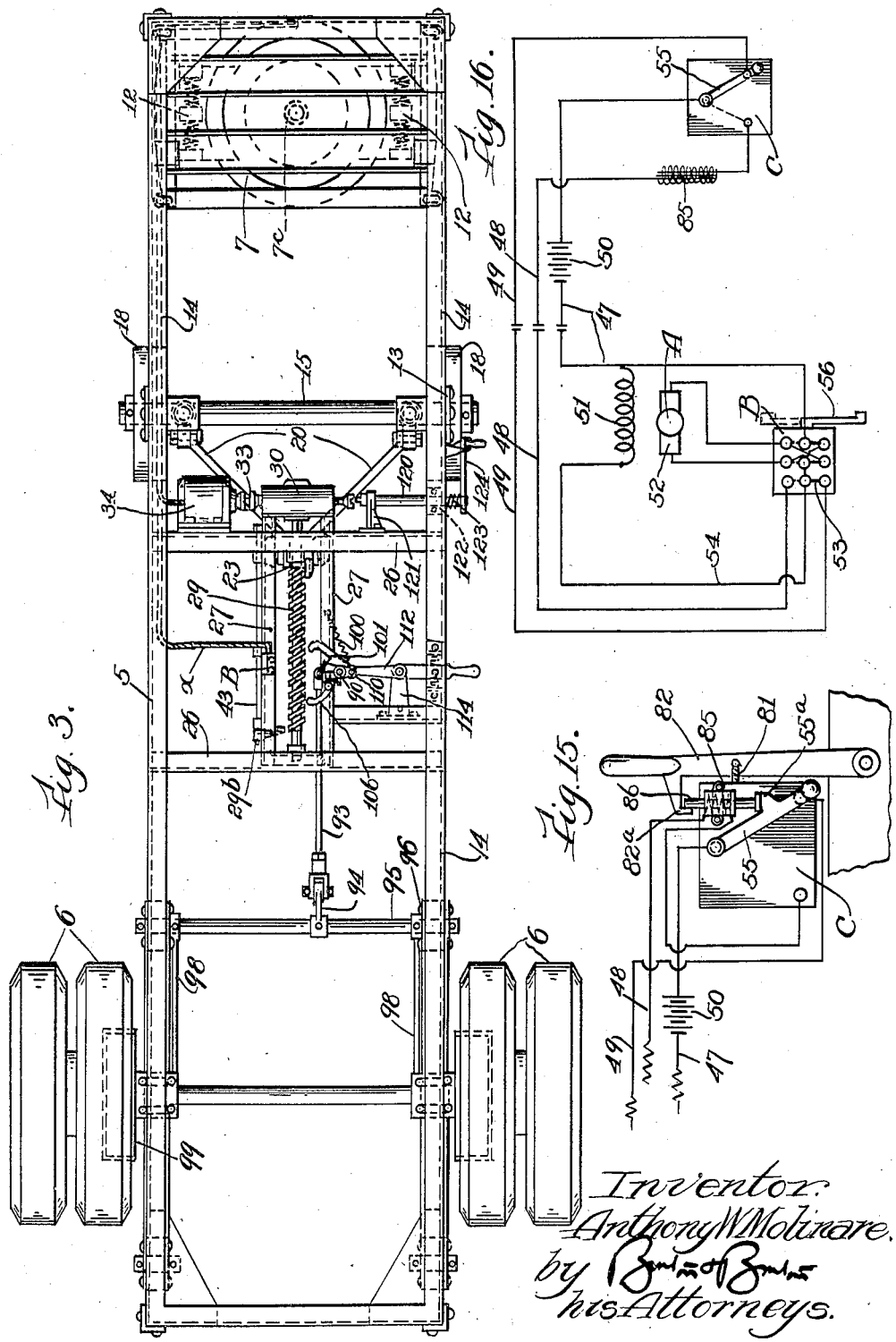
Inventor:
Anthony W. Molinare,
by his Attorneys.

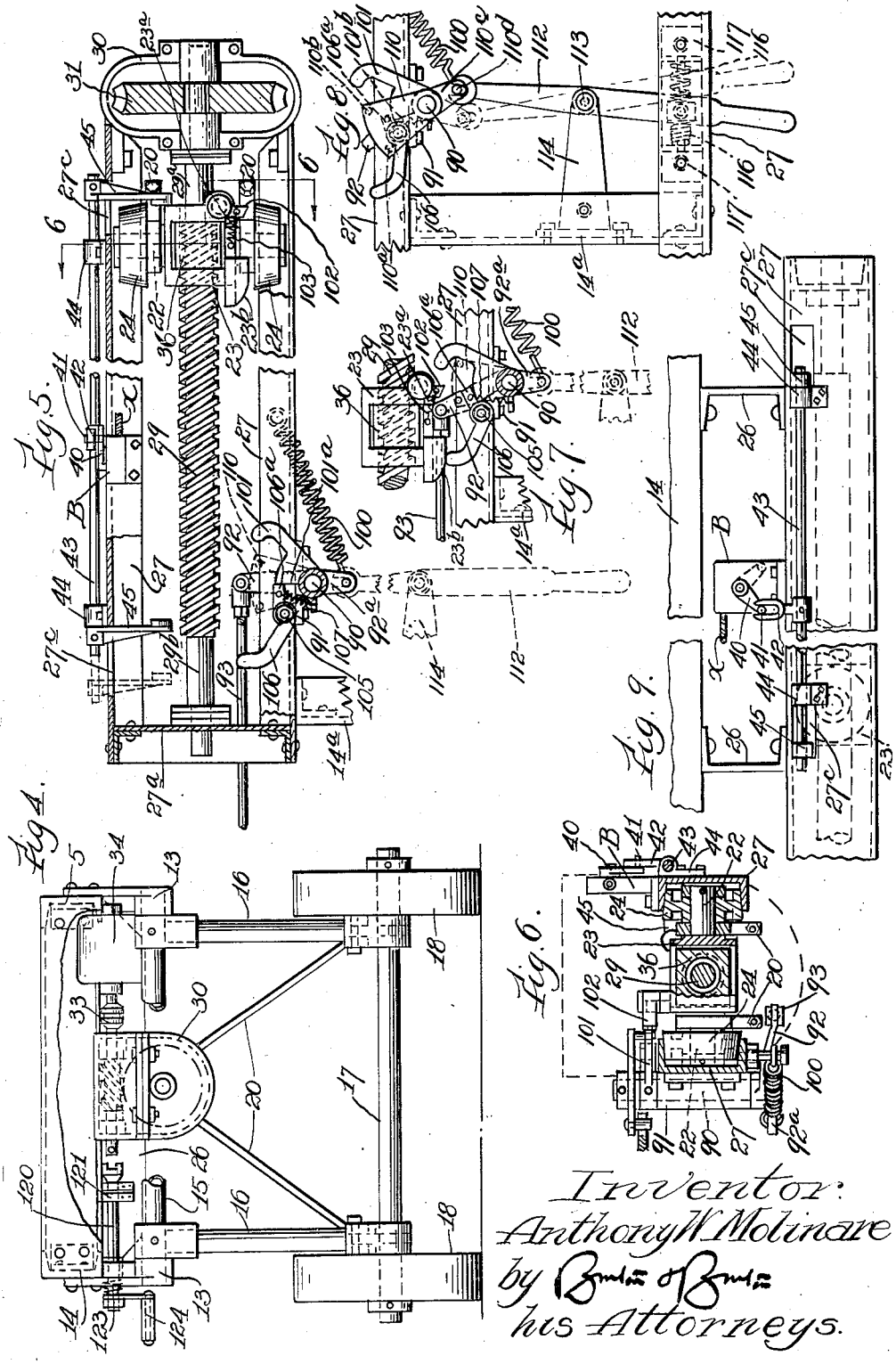

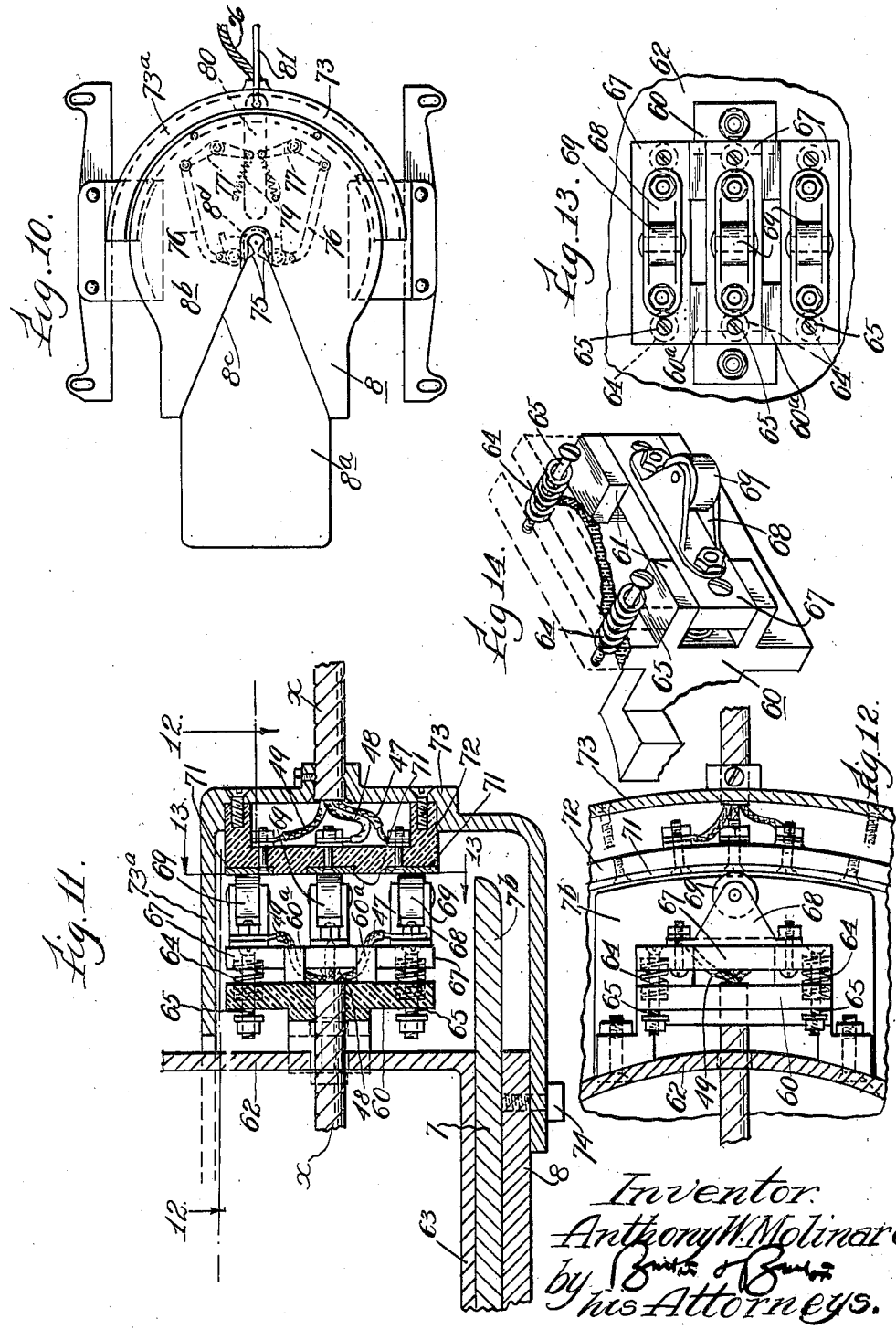

Patented Aug. 14, 1934

1,970,014

UNITED STATES PATENT OFFICE 1,970,014

AUTOMATIC TRACTOR-TRAILER COMBINATION

Anthony W. Molinare, Oak Park, Ill., assignor to Highway Trailer Company, Edgerton, Wis., a corporation of Wisconsin Application October 28, 1931, Serial No. 571,524

11 Claims. (Cl. 280—33.1)

This invention relates to a combined vehicle unit comprising a tractor and semi-trailer adapted to be coupled together for conjoint operation; and more particularly to an automatic tractor and trailer combination wherein the coupling and uncoupling of the respective units is entirely controlled from the cab of the tractor.

One of the objects of this invention is to provide an improved tractor and trailer combination wherein the operations preparatory to coupling and uncoupling of the vehicle units are performed by mechanism which is entirely under electrical control from the cab on the tractor. Another object resides in the provision of co-operating circuit connections on the respective vehicle units adapted to be engaged for automatically completing portions of the electrical circuits when the tractor is backed beneath the trailer in coupling relation. A further object of this invention is to provide novel mechanism for actuating the brakes on the trailer in response to the movement of the temporary supports to and from operative position. A still further object of this invention resides in the provision of novel, manually operable brake mechanism on the trailer for permitting manipulation of the brakes at will when the tractor is uncoupled from the trailer. It is also an object of my invention to provide safety control means in the tractor cab for preventing unlocking of the fifth wheel members of the vehicle units, preparatory to uncoupling, until the temporary supports have been shifted to operative position. Other objects and advantages will be apparent as the description proceeds, taken in connection with the accompanying drawings in which,—

Figure 1 is a side elevation of a trailer and a fragmentary portion of a tractor embodying the present invention; the temporary supports being shown in operative position preparatory to uncoupling of the tractor and trailer.

Figure 2 is an enlarged fragmentary vertical section taken substantially at the longitudinal center of the trailer showing the mechanism for operating the temporary supports and trailer brakes.

Figure 3 is a plan view of the trailer vehicle.

Figure 4 is a front end elevation of the trailer with the legs shown in operative position and with parts broken away to show certain features of construction.

Figure 5 is an enlarged horizontal sectional view taken substantially at line, 5—5, on Figure 1.

Figure 6 is a transverse vertical section taken substantially at line, 6—6, on Figure 5.

Figure 7 is a fragmentary plan view of the linkage for controlling the trailer brakes, showing the carrier on the screw operating the linkage to release said brakes.

Figure 8 is a detail plan view of linkage for manually manipulating the trailer brakes, shown adjusted in position corresponding to release of the brakes.

Figure 9 is a fragmentary view in side elevation of a portion of the trailer showing the automatic connections for reversing the electrical circuit controlling the motor.

Figure 10 is a detail plan view of the fixed lower fifth wheel member carried on the tractor.

Figure 11 is an enlarged vertical section taken substantially at the longitudinal center of the trailer through the coupled fifth wheel members of the tractor and trailer showing the electrical connections for completing portions of the electrical circuits from the trailer to the cab of the tractor.

Figure 12 is a detail view looking down on the electrical connections, taken substantially at line, 12—12, on Figure 11.

Figure 13 is a fragmentary front view of the electrical connections located on the trailer, and is taken substantially at line, 13—13, on Figure 11.

Figure 14 is a fragmentary perspective view of the electrical contact carrier block on the front end of the trailer.

Figure 15 is a more or less diagrammatic view of the safety control for preventing accidental release of the locking jaws of the coupling members prior to shifting of the legs to operative position.

Figure 16 is an electrical wiring diagram of the motor and control circuit.

For the purpose of illustration the semi-trailer shown in the drawings is of conventional construction having a main frame, 5, and supporting wheels, 6, adjacent its rear end. As seen in Figure 1 of the drawings the forward end of the trailer is supported by and swivelly connected to the tractor, indicated generally at A, by a coupling including an upper fifth wheel member, 7, on the trailer frame and a lower fifth wheel member, 8, fixedly mounted on the tractor frame, 9, which is partially supported by the wheels indicated at 10. The upper fifth wheel member, 7, is mounted for rocking fore-and-aft about a horizontal transverse axis indicated at 12, and it may be understood that it is so designed that it normally tends to tilt upwardly at the forward end in a direction so as to facilitate skidding up the inclined portion, 8$^a$, of the fixed fifth wheel member on the tractor when the latter is backed under the trailer preparatory to coupling of the vehicle units. It may be understood that these fifth wheel members are of conventional design, and if desired the fifth wheel members may be of reverse relation,—that is, the upper fifth wheel member being fixed on the trailer frame and the lower fifth wheel member rockably mounted on the tractor,—as long as the construction is such as to permit the vehicles to accommodate themselves to roadbed irregularities.

Adjacent the forward end of the trailer main frame there are provided temporary supports which are adapted to be shifted into operative position for supporting the forward end of the trailer when it is uncoupled from the tractor. These temporary supports include a pair of bearing brackets, 13, rigidly secured to the side frame members, 14, and journaled in said brackets are the ends of a transversely disposed supporting member, 15, on which are carried the main struts or leg members, 16. The lower ends of the legs are connected to a transversely extending axle, 17, on the outer ends of which are journaled ground-engaging wheels, 18. As may be seen from the drawings the supporting legs and wheels are adapted to be swung about the axis of the transverse member, 15, in the brackets, 14, by control links indicated at 20, which also serve as brace members when the supporting legs are disposed in operative position. When the legs are set in this position these brace members are disposed inclined to horizontal, and have their lower ends connected by bracket members, 16ª, to the axle, 17, adjacent the wheels, while their upper ends converge and are pivotally mounted in spaced apart relation on a pair of trunnions, 22, which are rigidly and integrally connected to a carriage, 23, of the operating mechanism which is arranged for longitudinal reciprocating movement, by virtue of which the supporting legs are moved to and from operating position. Rigidly secured to the lower flanges of the trailer frame side members, 14, are a pair of spaced apart transversely extending structural members, 26, to the under side of which are secured a pair of longitudinally extending transversely spaced channels, 27, rigidly connected at their opposite ends to form a fixed frame structure.

These channel members, 27, are positioned with their flanges in-turned so as to provide longitudinally extending guideways for the rollers, 24, which are journaled on opposite ends of the trunnion studs, 22, of the carriage, outside of the braces, 20, as may be seen in Figure 6 of the drawings.

Disposed substantially midway between the channel members, 27, is a longitudinally extending screw, 29, whose ends are reduced at 29ª and 29ᵇ, the rear end, 29ᵇ, being journaled and supported in the transverse frame member, 27ª, connecting the rear ends of the channel members, 27, while the forward end of the screw, 29, is provided with journal support in the gear housing, 30, which rigidly connects the forward ends of the channels, 27; said housing serving to enclose cooperating worm gear elements, 31 and 32, respectively.

Rigidly secured to the reduced forward end, 29ᵇ, of the screw which extends into the housing, 30, is the worm gear, 31, meshed with the worm, 32, which in turn is operatively connected by a coupling member, 33, to the rotor of an electric motor indicated at 34, which is supported on the adjacent transverse structural member, 26. Mounted for longitudinal movement on the screw, 29, is a nut, 36, anchored within the carriage, 23, so that by rotation of the screw in one direction, said nut, together with the carriage, is shifted longitudinally in the guiding frame members, 27.

This movement of the carriage is directly imparted through the brace members, 20, for shifting the supporting legs and their wheels either to or from operative position about the pivot axis of the supporting member, 15. By providing for reversal of the electrical motor, 34, it will be manifest that the mechanism may be operated to shift the supporting legs in either direction,—that is, either into or out of supporting position.

To expedite coupling and uncoupling of the tractor and trailer units so that these actions may be rendered substantially automatic and completely controlled from the driver's cab on the tractor,—it will be necessary to also control from the tractor the direction of rotation of the motor, 34. The electrical circuit for the motor should preferably include a reversing switch which is indicated at B, arranged for operation in response to movement of the nut or carriage, 23, to either of the respective limits, and for this purpose said switch is mounted on one of the channel members, 27, and is provided with an operating arm, 40, arranged for actuation by the traveling carriage when it reaches either limit of its movement so that when the shifting of the supporting legs in one direction has been completed the motor circuit is automatically set up for shifting the legs in opposite direction the next time the motor is energized.

As may be seen in Figures 5, 6 and 9, the switch arm, 40, is provided with a crank pin, 41, engaging in the forked end of a shifter arm, 42, and carried on a slidably mounted rod, 43, which in turn is carried in suitable guide brackets, 44, on the frame member, 27. At each end of the slidable rod, 43, is a tappet arm, 45, extending through slots, 27ᶜ, formed in said member, 27, as seen in Figure 5, positioned so that the carriage, 23, is adapted to encounter the same as it approaches one of its limits of movement and thereby cause shifting of said rod, 43, which in turn rocks the switch arm, 40. When the nut and carriage travel to the other end of the screw, 29, the opposite end of the carriage similarly engages the other tappet, 45, and shifts the rod, 43, back in opposite direction. The movement of the rod is limited by abutment of the hubs of the tappets, 45, against the adjacent brackets, 44.

In addition to the reversing switch, B, carried on the trailer the electrical circuit also includes a control switch, C, preferably located in the cab of the tractor and which serves primarily to connect at will the motor, 34, with a source of electrical energy such as a storage battery which may be carried either on the tractor or on the trailer, as may be preferred. It will of course be understood that if the storage battery is located on the trailer a supplemental control switch (not shown) may be provided on the trailer itself so as to permit operation of the temporary supports when the trailer is disconnected from the tractor. Such operation of the supports may be useful for slightly altering the height of the front end of the trailer for insuring and facilitating coupling when the tractor is backed under the trailer; but for most methods of use it is believed that this feature is unnecessary.

A suitable electrical circuit for controlling the motor on the trailer from the cab of the tractor is shown in the wiring diagram illustrated in Figure 16 of the drawings. For the purpose of illustration, the electrical circuit includes three conductors indicated at 47, 48, and 49, respectively, portions of which conductors are carried on the respective vehicle units, and positive contact between these respective portions of the electrical circuit is automatically made through the medium of electrical connections, hereinafter to be described, when the tractor is backed beneath the trailer in coupling relation. The portion of the electrical conductor or feed wire, 47, on the tractor is connected at one end to the battery, 50 (on the tractor), while the opposite portion of said conductor on the trailer is shown connected to the motor field coil, 51, and to the switch, B, which, as shown, is indicated as of the three-pole double throw type. Two of the contact arms of this switch serve the purpose of reversing the direction of current through the armature, 52, of the motor, and the third arm, indicated at 53, controls the flow of the current through the field, 51, to which it is connected by the wire, 54. The two lead wires, 48 and 49, form portions of alternate circuits from the switch arm, 55, to the control switch, C, on the tractor through which they are alternatively coupled to the battery, 50, when the switch arm, 55, is swung from one of its limiting positions to the other. The three contact arms of the switch, B, are simultaneously operable by the connecting bar indicated at 56, which corresponds to the arm indicated at 40 in Figures 5, 6 and 10, for actuating the switch, B.

Upon a perusal of the wiring diagram shown in Figure 16 it will be seen that swinging the contact arms of switch, B, from one position to the other not only reverses the armature of the motor, but transfers the field connection from the conductor wire, 49, to the conductor wire, 48, or vice versa. By such movement the field circuit is opened, necessitating movement of the switch arm, 40, to its other limit in order to again complete the electrical circuit; and when said switch arm is thus moved, the motor, 34, will be operated in reverse direction. It is to be understood that the switches, B and C in Figure 16 of the drawings, are in a position which corresponds to a condition where the temporary supports are in process of being raised; and when the supports arrive at their upper limit or inoperative position, the switch, B, will have been caused to be reversed as hereinafter described.

It is to be understood, and as will hereinafter be referred to in detail, that the upper and lower fifth wheel members of the respective vehicle units are constructed in a usual manner with means for automatically locking them together in coupled relation when the tractor has been backed beneath the trailer. I have provided means which include cooperating features on the respective fifth wheel members which serve to automatically complete the electrical circuits by positively connecting the respective portions of said electric circuits on the vehicle units substantially when the fifth wheel members are locked together in coupled relation. These electrical connections, as may be seen in the drawings are, for practical purposes and ease in operation, located remotely from the axis of articulation of the fifth wheel members. Said means includes a supporting block, 60, of insulating material which is rigidly secured to an up-standing flange, 62, of a bracket member, 63, secured to the forward end of the upper fifth wheel member, as seen in Figure 11 of the drawings.

The outer face of the insulating block, 60, is formed with two sets of vertically spaced transversely extending lugs, 60ª, providing guideways in which are seated contact blocks, 67, to which are rigidly secured brackets, 68, carrying contact rollers, 69, preferably as shown disposed in vertical alignment. A pair of transversely spaced coil springs, 64, are provided for each of the roller blocks, 67, and said blocks and the front face of the block, 60, are recessed to form pockets for the spring bolts, 65, which are provided for connecting the blocks, 67, to the supporting block, 60, and limiting separation thereof. For convenience, the conductor wires from the switch, B, and the motor are encased in a metal flexible sheath as indicated at X, the end of which adjacent the front end of the trailer is anchored in the upstanding leg, 62, of the bracket on the upper fifth wheel member, and the conductor leads, 47, 48 and 49 extend therefrom and connect to the respective contact rollers, 69.

Mounted on the lower fifth wheel member on the tractor in cooperative relation with the rollers, are three metal conductor strips, 71, which are rigidly secured to an insulating block, 72, of arcuate formation which in turn is rigidly secured in an arcuately formed auxiliary bracket, 73. Said bracket is fastened by screws, 74, to the lower fifth wheel member on the tractor, and connected to the respective contact strips, 71, are the corresponding portions of the conductor wires, 47, 48 and 49, which complete the electrical circuit through the battery, 50, and control switch, C. The conductors, 47—48—49, on the tractor are also encased in a flexible sheath "x", the end of which is rigidly secured in a boss on the bracket, 73, as seen in Figure 11. It may be understood that the arcuate contact strips, 71, and supports therefor extend approximately 180 degrees so as to permit contact of the respective portions of said conductor wires on the vehicle units throughout substantially the entire range of articulation of said vehicle units. It will now be seen that the springs, 64, which normally urge the blocks, 67, with their contact rollers, 69, outwardly with respect to the support, 61, insures a yielding contact with the contact strips, 71, of the lower fifth wheel member when the fifth wheel members are brought into coupling relation.

The upper edge of the supporting bracket, 73, on the lower fifth wheel members is preferably formed with a horizontally extending arcuate flange, 73ª, positioned to overlie the electrical contacts on the trailer throughout the entire range of articulation of the vehicles, and thus serves to protect said contacts against the elements and shield them from foreign matter.

To protect the contact elements on the upper fifth wheel member against possible injury incident to coupling or uncoupling of the fifth wheel members, the upper fifth wheel member is preferably formed with an extension indicated at 7ᵇ, substantially underlying the contact rollers and their supporting structure so that this portion, 7ᵇ, acts as a shoe which will first come in contact with the surface of the lower fifth wheel member, as said members are being coupled, and thus prevent any possible chance of damaging the contact rollers, 69. It will be manifest that the contacts between the rollers, 69 and the strips, 71, on the lower fifth wheel member on the tractor will freely separate to break the respective portions of the electric circuits when the fifth wheel members are separated in uncoupling of the vehicle units.

It will be manifest that the automatic circuit connections above described may be employed in various instances for controlling electrically operated mechanisms on the trailer, such as electric brakes, etc.

As shown in Figure 10 of the drawings the lower fifth wheel member is of more or less conventional design, the main supporting surface, 8b, being formed with a rearwardly open V-shaped gap, 8c, the apex of which terminates to form a bearing for a headed king pin indicated at 7c, carried on the upper fifth wheel member on the trailer. It will be understood that the bearing portion of the lower fifth wheel member is undercut as indicated at 8d, in a conventional manner to accommodate the head of said king pin, and thus prevent vertical separation of the fifth wheel members when they are coupled.

Mounted on the under side of the lower fifth wheel member are a pair of pivoted jaws, 75, which are adapted to yield in one direction to permit entry of the king pin into the bearing portion of the lower fifth wheel member. The links 76, and bell crank levers, 77, under the control of the tension spring, 79, normally cause said jaws to snap back into locking position when released, as seen in Figure 10 of the drawings, and are designed so that the king pin may engage said jaws, and by contact therewith swing them open for entering the bearing of the lower fifth wheel member, and there be automatically locked in place therein by said jaws, when the fifth wheel members are brought into coupling relation.

The free ends of the bell crank levers, 77, are connected to a control member, 80, which is connected preferably to a flexible member, 81, which extends into the cab of the tractor and is connected to operating lever 82, pivoted to the tractor frame, and this lever may be conveniently manipulated at will for releasing the jaws, 75, thereby freeing the king pin so as to permit separation of the fifth wheel members in uncoupling of the vehicle units.

To avoid any possibility of accident or damage due to manipulation of the locking jaws before the temporary supports or legs, 16, are disposed in operative position, I have provided a safety control between the switch arm, 55, of the switch, C, and the lever, 82, which controls said jaws. For this purpose I employ a solenoid, 85, whose armature, 86, is adapted to cooperate and serve as a detent engaging in back of a depending lug, 82a, of the shift lever, 82, so that under certain conditions the lever cannot be shifted to release the jaws, 75. As may be seen in Figure 15, the control lever, 55, is formed with a lug, 55a, which is adapted to engage the lower end of the armature, 86, for shifting it into detent relation with the lug, 82a. The solenoid, 85, is connected in the portion of the conductor wire, 48, on the tractor adjacent its connection to its contact point of the switch, C.

It will be understood that when the switch arm, 55, is in the position shown in Figure 15, the supporting legs on the trailer are in the process of being raised to inoperative position, and when said legs arrive at such position the switch, B, is then reversed with respect to the position shown in Figure 16, by engagement of the rearward tappet, 45, with the carrier, 23. In order to complete the electrical circuit for causing lowering of the legs, it will be necessary to swing the switch arm, 55, to the left to complete the circuit through the other contact by way of conductor wire, 48, which includes the solenoid interposed in the line, and when said arm, 55, is swung to such position the solenoid becomes energized and will still maintain the armature, 86, substantially in the position shown in Figure 15 in the drawings, in which position the lever, 82, is still held against forward movement, thus preventing release of the coupling jaws, 75, for the time being, during which the supporting legs are dropped to operative position. When the electrical circuit is again broken due to the fact that the switch, B, is reversed through the shift rod, 43, by engagement of the forward tappet, 45, with the carrier, 23, at which time the legs arrive at supporting position, the circuit will be broken and the solenoid de-energized and the armature, 86, is then permitted to drop by gravity so that it is out of the path of movement of the lug, 82a, thus permitting said lever, 82, to be shifted for opening the coupling jaws, 75, to release the king pin, 7c, thereby permitting the vehicles to be separated. It will be understood that there is enough tension in the linkage between the operating lever, 82, and the jaws, 75, so that the lever, 82, when released, is normally returned to upright position, as seen in Figure 15, at which position the armature, 86, of the solenoid may be freely projected up behind the lug, 82a, when the control lever, 55, is swung to the position at which it engages the lower end of said armature.

In order that the coupling of the tractor and trailer may be completely controlled from the cab of the tractor it is also necessary to control the operation of the brakes of the trailer so that in uncoupled relation the brakes will be in applied position, and will be promptly released when coupling of the vehicle units is completed. For this purpose I have provided a novel and simplified mechanism which includes a vertically disposed pivot shaft, 90, which is journaled in a bearing bracket, 91, secured to the channel member, 27, opposite the switch, B. At the lower end of the shaft, 90 is rigidly secured a lever arm, 92, to the outer end of which is connected a rearwardly extending rod, 93, which in turn is pivotally connected to a lever, 94, rigidly secured on a transversely disposed rock shaft, 95. Said shaft is journaled at its opposite ends in brackets, 96, secured to the frame members, 14, of the trailer, and mounted adjacent the ends of said rock shaft are levers, 97, which through rods, 98, control operation of the brakes indicated diagrammatically at 99 on the rear wheels of the trailer. The brake lever, 92, has an oppositely extending leg, 92a, to which is connected a coil spring, 100, the opposite end of which is anchored to the channel member, 27, and tends to swing the lever, 92, and pivot shaft, 90, in counter-clockwise or brake-releasing direction. Mounted on the upper end of the shaft, 90, is a lever, 101, whose outer end is positioned for contact with a pivoted pawl, 102, mounted on the upper surface of the carrier, 23, and under the control of a spring, 103, which normally retains said pawl against a fixed stop, 23a, on said carrier.

Mounted about a vertical pivot, 105, is a detent lever, 106, on the upper surface of the top flange of the adjacent frame member, 27, which lever, 106, has a lug, 106a, to which is connected a coil spring, 107, arranged for swinging the lever in clockwise direction. The end of this lug, 106a, is adapted to cooperate with an abutment in the nature of an offset shoulder, 101a, of the lever, 101, when the lever, 101, has been swung to the position indicated in Figure 5. Thus when the carrier, 23, commences to move forwardly from the rearward end of the screw, which movement commences to shift the supporting legs, 16, into operative position, the pawl, 102, on the carrier engages the end of the lever, 101, and swings it to brake-operating position indicated in Figure 5, at which position the spring, 107, is permitted to swing the lever, 106, so that its lug, 106ª, comes in abutting contact with the shoulder, 101ª, of the lever, 101, and thus holds said lever, 101, in such position. This movement of the lever has also caused rotation of the shaft, 90, and which through the lever, 92, has caused operation of the brake linkage for applying the brakes, 99. It will be apparent that the brakes will remain in applied position during the continued movement of the carriage in a forward direction beyond the detent levers, and during the entire time that the carriage remains at forward position, at which time the supporting legs, 16, are in operative position.

When the tractor is backed beneath the trailer preparatory to coupling of vehicles, such movement is utilized to complete the electrical contacts, and the switch arm, 55, may then be swung to the other contact for completing the electrical circuit which will cause reversal of the motor and screw and rearward movement of the carriage, 23, therein for withdrawing the legs upwardly to inoperative position. As may be seen in Figure 5, the rear end of the carriage is formed with a cam-shaped lug indicated at 23ᵇ, which is positioned to encounter the end of the lever, 106, as the carriage approaches its rearward limit (as seen in Figure 7) and thereby rock the lever, 106, about its pivot, causing shifting of the lug, 106ª, out of contact with the abutment, 101ª, of the lever, 101, so that said lever, 101, and the brake linkage is then permitted to return to released position due to the spring, 100, and also to the springs normally employed in the brake linkage for such purposes; this action takes place substantially as the supporting legs arrive at their upward or inoperative position. Thus, while the carriage remains at the rearward limit of movement, as seen in Figure 7, the brakes are normally in released position. It will also be apparent that the brakes are caused to be applied almost immediately after the supporting legs have commenced to be lowered to operative position.

Frequently occasion arrives when it is desirable to be able to manipulate the trailer while it is uncoupled from the tractor, (in which case the brakes would be applied), and for this purpose I make provision for manually releasing and applying the brakes. The means provided for this purpose includes a specially formed lever, 110, mounted at the upper end of the shaft, 90, and having downwardly extending lugs, 110ª and 110ᵇ, which are adapted to cooperate with adjacent portions of the respective levers, 101 and 106. It will be understood, however, that this lever, 110, is so designed and dimensioned that the lugs are positioned normally out of contact with said levers, 101 and 106, so as to permit freedom of movement of said levers, by encounter with the pawl or cam lug 23ᶜ, on the carrier. The lever, 110, has an extension, 110ᶜ, provided with a vertically disposed pin, 110ᵈ, with which cooperates the forked end of a shift lever, 112, which is pivotally mounted at 113, on a bracket, 114, carried on a cross member, 14ª, of the trailer main frame.

The handle member, 112, has its outer end extending laterally beyond the side members of the trailer frame so as to be conveniently accessible.

This lever, as shown in Figure 5, is disposed in neutral position, and it is understood that when it is swung to the left, as seen in Figure 8, the adjacent lug, 110ª, is brought into camwise contact with the edge of the lever, 106, swinging it about its pivot so as to shift the lug, 106ª, out of engagement with the abutment, 101ª, of the lever, 101, permitting said lever, 101, and the shaft, 90, to rotate in counter-clockwise direction for releasing the trailer brakes.

When the lever, 112, is shifted to the right, as indicated in dotted lines in Figure 8, it will bring the other lug, 110ᵇ, of the lever, 110, into camwise contact with the lever arm, 101, and thereby swing it in clockwise direction to the position at which the lug, 106ª, may be snapped behind the abutment, 101ª, by the action of spring, 107; in this position of adjustment the brakes are applied. To insure against possible obstruction to the freedom of operation of the lever members, 101 and 106, by the lever, 110, it is desirable to provide means for holding the manually controlled lever, 112, in neutral position, and for this purpose I provide a pair of coil springs, 116, acting against opposite sides of the lever between stop blocks, 117, on the side member, 14, of the trailer frame, as seen in Figure 8 of the drawings.

To ensure that the supporting legs can be manipulated in the event that something goes wrong with the electrical circuit, there is provided a manually operable connection for shifting the legs to and from operative position. This mechanism includes a transversely extending shaft, 120, journaled in brackets, 121 and 122, and disposed in axial alignment with the axis of the worm, 32. The shaft and adjacent nut of the worm are provided with cooperating coupling connections so as to permit engagement and rotation of one by the other. The shaft, 120, is preferably normally held out of engagement with the worm by a coil spring, 123, interposed between the bracket, 122, and the operating handle, 124 by means of which said shaft may be rotated for imparting rotation to the screw and thereby causing shifting of the supporting legs to or from operating position.

Although I have shown a preferred embodiment of the present invention, it is manifest that it is capable of modification and rearrangement of parts without departing from the spirit and scope thereof. I do not, therefore, wish to be understood as limiting myself to the particular construction herein shown and described, except as indicated in the appended claims.

I claim:

1. In combination with a tractor and a semi-trailer having a main frame, a fifth wheel providing articulation between the vehicle units, a temporary support carried on the trailer main frame and mounted for movement relative thereto into and out of operative position, electrically operated mechanism on the trailer operably connected to said temporary support for actuating the same, a source of electrical energy on one of the vehicle units, electrical connections on the respective vehicle units adapted to be engaged when the tractor is backed beneath the trailer, during coupling of the vehicle units, for completing one or more portions of the electrical circuit which controls said mechanism on the trailer, and control means on the tractor for closing the electrical circuit and actuating said mechanism on the trailer for shifting said support to operative position.

2. In combination with a tractor and a semi-trailer having a main frame, a fifth wheel providing articulation between the vehicle units, a temporary support for the forward end of the trailer mounted for movement relative to the main frame, electrically operated mechanism on the trailer operably connected to said temporary support for actuating the same, a source of electrical energy on one of the vehicle units, electrical connections on the respective vehicle units adapted to be engaged when the tractor is backed beneath the trailer during coupling of the vehicle units, for completing one or more portions of the electrical circuit which controls said mechanism on the trailer, and remote control means on the tractor for actuating said mechanism on the trailer for shifting said temporary support to inoperative position.

3. In combination with a tractor and a semi-trailer having a main frame and supporting wheels at the rear end thereof, a fifth wheel providing articulation between the vehicle units, a temporary support carried on the trailer main frame, adjacent the forward end and mounted for movement relative thereto into and out of operative position, a source of electrical energy on one of the vehicle units, electrically operated mechanism on the trailer operably connected to said temporary support, control means on the tractor for actuating said mechanism on the trailer for shifting said support to and from operative position, electrical connections on the respective vehicle units adapted to be engaged when the tractor is backed beneath the trailer during coupling of the vehicle units, for completing one or more portions of the electrical circuit which controls said mechanism on the trailer, brakes on the trailer wheels, and means actuated by said mechanism for setting the trailer brakes when the temporary support is shifted to operative position preparatory to uncoupling of the vehicle units.

4. In combination with a tractor and semi-trailer having a main frame and supporting wheels at the rear end thereof, a fifth wheel providing articulation between the vehicle units, a temporary support movably mounted adjacent the forward end of the trailer frame, electrically operated mechanism on the trailer connected to said temporary support and adapted for shifting the same to and from operative position, a source of electrical energy on one of the vehicle units, electrical connections on the respective vehicle units adapted to be engaged when the tractor is backed beneath the trailer, during coupling of the vehicle units, for completing one or more portions of the electrical circuit which controls the mechanism on the trailer, remote control means on the tractor for actuating said electrically operated mechanism for shifting the temporary support to and from operative position, brakes on the trailer wheels, and means for setting said brakes when the temporary supports are moved to operative position, and adapted for releasing the same when said supports are shifted to inoperative position.

5. In combination with a tractor and semi-trailer having a main frame, a temporary support movably mounted on said main frame adjacent the forward end, electrically operated mechanism on the trailer connected to said temporary support, electrical connections on the respective vehicle units adapted to be engaged when the tractor is backed beneath the trailer during coupling of the vehicle units, for completing one or more portions of the electrical circuit which controls said electrically operated mechanism on the trailer, remote control means on the trailer to cause shifting of the temporary support into operative position, means operated from the tractor for permitting uncoupling of the tractor and trailer, and means inter-connecting said control means and said last mentioned means for preventing uncoupling of the vehicle units unless the temporary support is disposed in operative position.

6. In combination with a tractor and semi-trailer having a main frame, a temporary support movably mounted on said main frame adjacent the forward end, electrically operated mechanism on the trailer connected to said temporary support, electrical connections on the respective vehicle units adapted to be engaged when the tractor is backed beneath the trailer during coupling of the vehicle units for completing one or more portions of an electrical circuit which controls said electrically operated mechanism on the trailer, remote control means on the tractor for operating said mechanism on the trailer to cause shifting of the temporary support into operative position, means including an operating lever on the tractor for permitting uncoupling of the tractor and trailer, and means including a solenoid connected in the electrical circuit and arranged to operatively engage said lever on the tractor for preventing operation thereof and uncoupling of the vehicle units unless the temporary support is disposed in operative position.

7. In the construction defined in claim 6, said control means including a switch having an operating arm for making and breaking the electrical circuit, said arm being adapted when disposed in the position of adjustment corresponding to operative position of the support to shift the core of the solenoid into locking engagement with said operating lever.

8. In combination with a tractor, a semi-trailer having a frame, supporting wheels at the rear end of the frame, brakes on said wheels, a fifth wheel providing articulation between the vehicle units, temporary supporting means pivotally mounted on the trailer frame, electrically operated mechanism on the trailer for shifting the temporary supporting means to and from operative position, said mechanism including a motor and electrical circuit connecting said motor to a source of electrical energy on one of said vehicle units, said mechanism also including reversible gearing driven by the motor, a screw rotated thereby, a carriage longitudinally reciprocable on the screw, and operating links connecting the carriage with the temporary supports for operating the same, remote control means on the tractor for completing the electrical motor circuit at will, said electrical circuit including branches for causing reversal of the direction of the motor when the temporary supporting means arrives at its limits of movement, and brake operating mechanism actuated by the movement of the carriage when the temporary supporting means is being moved to operating position, and adapted to be released by engagement with the carriage as it approaches its limit of return movement, at which position the temporary supporting means is disposed in raised inoperative position.

9. In the construction defined in claim 8, manually operated means associated with the brake operating mechanism for releasing and applying the brakes at will.

10. In combination with a tractor and semi-trailer having a main frame and supporting wheels at the rear end thereof, a fifth wheel providing articulation between the vehicle units, brakes on said trailer wheels, electrically operated mechanism on the trailer for actuating said brakes, electrical connections on the respective vehicle units, adapted to be engaged when the tractor is backed beneath the trailer in coupled relation, for completing and maintaining one or more portions of the electrical circuit which controls said electrically operated mechanism on the trailer, control means on the tractor operable at will for actuating said mechanism on the trailer for operating the brakes, means on the tractor for controlling the uncoupling of the vehicle units, and means associated with said control means and said last mentioned means for preventing uncoupling of the vehicle units unless the trailer brakes are in applied position.

11. In combination with a tractor, a semi-trailer having a frame, supporting wheels at the rear end of the frame, brakes on said wheels, a fifth wheel providing articulation between the vehicle units, temporary supporting means pivotally mounted on the trailer frame, electrically operated mechanism on the trailer for shifting the temporary supporting means to and from operative position, said mechanism including a motor and an electrical circuit connecting said motor to a source of electrical energy on one of said vehicle units, said mechanism also including reversible gearing driven by the motor, a screw rotated thereby, a carriage longitudinally reciprocable on the screw, and operating links connecting the carriage with the temporary supports for operating the same, electrical connections on the respective vehicle units adapted to be operatively engaged when the tractor is backed beneath the trailer during coupling of the vehicle units, remote control means on the tractor for completing the electrical motor circuit at will, said electrical circuit including branches for causing reversal of the direction of the motor when the temporary supporting means arrives at its limits of movement, and brake operating mechanism actuated by the movement of the carriage when the temporary supporting means is being moved to operating position, and adapted to be released by engagement with the carriage as it approaches its limit of return movement, at which position the temporary supporting means is disposed in raised inoperative position.

ANTHONY W. MOLINARE.